United States Patent [19]

Lucarelli et al.

[11] 4,307,220

[45] Dec. 22, 1981

[54] PURIFICATION OF ACETYLENE-TERMINATED POLYIMIDE OLIGOMERS

[75] Inventors: Michael A. Lucarelli, Binghamton, N.Y.; Lewellyn G. Picklesimer, Dayton, Ohio

[73] Assignee: The United States of America as represented by the Secretary of the Air Force, Washington, D.C.

[21] Appl. No.: 100,327

[22] Filed: Dec. 5, 1979

Related U.S. Application Data

[63] Continuation-in-part of Ser. No. 39,932, May 17, 1979, abandoned.

[51] Int. Cl.³ .................... C08G 73/12; C08G 73/10; C08J 3/14
[52] U.S. Cl. .................... 528/128; 528/188; 528/192; 528/350; 528/353; 528/392; 528/488; 528/492; 528/494; 528/496; 528/499
[58] Field of Search .............. 528/392, 488, 492, 494, 528/496, 499, 128, 188, 192, 350, 353

[56] References Cited

U.S. PATENT DOCUMENTS

| | | | |
|---|---|---|---|
| 3,679,638 | 7/1972 | Korsgen et al. | 528/488 |
| 3,845,018 | 10/1974 | Bilow et al. | 528/192 |
| 3,864,309 | 2/1975 | Bilow et al. | 260/33.4 R X |
| 3,879,349 | 4/1975 | Bilow et al. | 528/188 |
| 4,218,555 | 8/1980 | Antonoplos et al. | 528/128 |

*Primary Examiner*—Howard E. Schain
*Attorney, Agent, or Firm*—Donald J. Singer; William J. O'Brien

[57] ABSTRACT

A process for purifying an acetylene-terminated polyimide oligomer containing residual solvent in which the oligomer is initially dissolved in the same solvent used as the reaction medium in its synthesis. After precipitating the oligomer from solution by mixing with an aqueous solution of potassium or sodium chloride, the precipitated oligomer is washed successively with a plurality of liquids of decreasing polarity to provide an oligomer free of residual solvent.

4 Claims, No Drawings

PURIFICATION OF ACETYLENE-TERMINATED POLYIMIDE OLIGOMERS

RIGHTS OF THE GOVERNMENT

The invention described herein may be manufactured and used by or for the Government of the United States for all governmental purposes without the payment of any royalty.

This application is a continuation-in-part of pending U.S. application Ser. No. 039932, filed on May 17, 1979, now abandoned.

FIELD OF THE INVENTION

This invention relates to a process for purifying acetylene-terminated polyimide oligomers.

BACKGROUND OF THE INVENTION

Acetylene-terminated polyimide oligomers show promise as matrix resins for advanced aircraft and aerospace systems. The materials have the potential of curing without the evolution of volatile by-products, thereby obviating the problem of void formation in composite structures and molded articles. Unfortunately, the oligomers normally contain residual amounts of the solvent employed in their synthesis. During curing operations, voids are formed in the composites or molded objects as a result of the volatilization of the residual solvent.

It is a principal object of this invention, therefore, to purify acetylene-terminated polyimide oligomers by removing residual solvent therefrom.

Other objects and advantages of the invention will become apparent to those skilled in the art upon consideration of the accompanying disclosure.

SUMMARY OF THE INVENTION

The present invention resides in a process for purifying an acetylene-terminated polyimide oligomer containing residual solvent. In accordance with the process, the oligomer is dissolved in the same solvent used as the reaction medium in its synthesis. The resulting solution is thereafter mixed with an aqueous solution of potassium or sodium chloride, thereby causing the oligomer to precipitate from solution. The recovered oligomer is then transferred successively from a plurality of liquid baths of decreasing polarity. After recovery from the last bath, the oligomer is dried, preferably under a vacuum at an elevated temperature. Treatment of the oligomer according to the foregoing procedure removes residual solvent, thereby making the material easier to process and eliminating the emission of volatiles and concomitant formation of voids. While it is not intended to limit the invention to a particular theory, it is believed that the salt displaces the residual solvent. (It is noted that when the oligomer solution is added to salt-free water, a very fine suspension is formed that is virtually impossible to separate.) In subsequent washings in liquid baths of decreasing polarity, each wash liquid displaces the previous wash liquid along with any remaining solvent.

In a more specific embodiment, the solution of the oligomer is added with stirring to a solution containing about 4 to 10 weight percent potassium or sodium chloride in water, thereby precipitating the oligomer from solution. The recovered oligomer is then washed successively with (1) water, (2) a mixture of methanol and water, (3) methanol, (4) a mixture of ether and methanol, and (5) ether. After recovery from the ether, the oligomer is dried as indicated before. To ensure complete removal of ether, it is often preferred to heat the dried oligomer in an oil bath at a temperature ranging from about 90° to 110° C. for a period of 0.5 to 1.5 hours.

In a preferred procedure for carrying out each of the five washing stages, the oligomer is washed at least once, e.g., 1 to 5 times, with each of the materials. In the first washing stage, distilled water is used and the water wash is usually repeated several times, e.g., 3 to 5 times, to ensure removal of any salt and solvent carried over on the oligomer. A mixture containing 50 percent by volume methanol and 50 percent by volume water is used in the second washing stage followed by washing with 100 percent methanol in the third stage. In the fourth stage, a mixture of ether and methanol is used and it is preferred to carry out this stage in several steps utilizing increasing amounts of ether and decreasing amounts of methanol. For example, the stage can be conducted in four steps, utilizing in sequence a 20 percent ether-80 percent methanol mixture, a 40 percent ether-60 percent methanol mixture, a 60 percent ether-40 percent methanol mixture, and an 80 percent ether-20 percent methanol mixture. In the final and fifth stage, the oligomer is washed with 100 percent ether. Generally, the oligomer is washed with ether three or more times in the final stage. Each of the washings is carried out with stirring for a period of about 1 to 3 minutes. After each washing, the oligomer is separated by any suitable means, e.g., by decantation or filtration, and then introduced into the next bath.

Acetylene-terminated polyimide oligomers are well known materials that are described in the literature. While the present invention is applicable to acetylene-terminated polyimide oligomers generally, it is particularly relevant to an oligomer having the following structural formula:

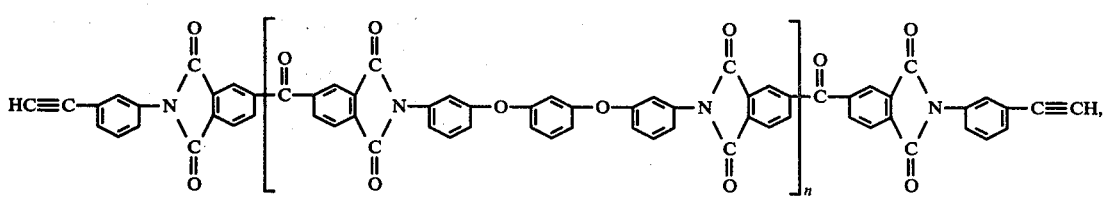

where n is 1 or 2.

The polyimide oligomers according to the foregoing formula are prepared as described in U.S. Pat. No. 3,845,018, issued to Bilow et al on Oct. 29, 1974. The oligomers are also disclosed in U.S. Pat. Nos. 3,864,309 and 3,879,349, which also issued to Bilow et al. As disclosed in U.S. Pat. No. 3,845,018, in the synthesis of the oligomers, a solvent such as dimethylformamide is utilized. The oligomers are available from Gulf Chemicals Co., being sold under the trademarks Thermid 600(n=1) and Thermid 602(n=2). In the preparation of these commercially available oligomers, 1-methyl-2-pyrrolidinone is employed as the solvent. However, it should be understood that the process of the present invention is applicable to the purification of acetylene-terminated polyimide oligomers regardless of the solvent employed in their synthesis.

A more complete understanding of the invention can be obtained by referring to the following illustrative examples which are not intended, however, to be unduly limitative of the invention.

EXAMPLE I

A run was conducted in which an acetylene-terminated polyimide oligomer containing a residual amount of solvent was purified in accordance with the process of this invention. The polyimide oligomer used was Thermid 600, as indicated above a product of Gulf Chemicals Co., which contained a residual amount of the solvent 1-methyl-2-pyrrolidinone (NMP).

In the run, 10.5 g of the Thermid; 600 oligomer was dissolved in 250 ml of warm NMP. The solution was precipitated into a stirred 8 percent by weight sodium chloride and water solution. The precipitate was allowed to settle and the excess water was removed. The precipitate was then washed five times with distilled water to remove any sodium chloride and NMP that remained on the precipitated oligomer. The precipitate was then transferred from water to methanol to ether according to the following sequence:

(a) the precipitate was transferred from water into a mixture containing by volume 50% methanol and 50% water;

(b) the precipitate was transferred to 100% methanol and washed twice with pure methanol;

(c) the precipitate was transferred to a mixture containing by volume 20% ether and 80% methanol;

(d) the precipitate was transferred to a mixture containing by volume 40% ether and 60% methanol;

(e) the precipitate was transferred to a mixture containing by volume 60% ether and 40% methanol;

(f) the precipitate was transferred to a mixture containing by volume 80% ether and 20% methanol; and (g) the precipitate was transferred to 100% ether and washed three times with 100 ml of ether. In each of the above-described wash steps, the mixture was stirred for about 2 minutes after which the oligomer was separated by filtration.

The oligomer recovered from wash step (g) was dried under a vacuum. The dried material was then heated at 100° C. for 1 hour in an oil bath to remove any possible residual ether.

EXAMPLE II

The Thermid 600 oligomer, prepared as described in Example I, was used to make neat dogbone and rheometric bar specimens. In preparing each specimen, purified oligomer was added to a mold which had been sprayed with a fluorocarbon release agent and preheated to 350° F. A hydraulic press was preheated to 385° F. and the mold was placed in the press and held at 450° F. and >200 psi for 0.5 to 1.0 hour. The mold was then allowed to cool to room temperature after which the specimen was removed from the mold. Control runs following the same procedure were also conducted in which specimens were prepared from untreated Thermid 600 oligomer.

The purified oligomer was easier to process than the unpurified oligomer in that it flowed easier and more evenly after melting. The specimens made from the purified oligomer were free of cracks and voids. The specimens made from the untreated oligomer had voids and cracks caused by the release of residual NMP.

EXAMPLE III

A run was conducted in which 50 g of Thermid 600 oligomer containing residual NMP was dissolved in 750 ml of NMP. The resulting solution was filtered to remove any impurities that might not have dissolved. The procedure described in Example I was followed except that the solution was precipitated into a stirred 4 percent by weight sodium chloride and water solution.

EXAMPLE IV

A run was carried out in which 50 g of Thermid 600 oligomer containing residual NMP was dissolved in 750 ml of NMP. The procedure described in Example I was followed except that the solution was precipitated into a stirred 8 percent by weight potassium chloride and water solution.

EXAMPLE V

Thermid 602 oligomer containing residual NMP was purified by following the procedure described in Example I. Mass spectroscopy of the purified oligomer indicated that it was free of NMP.

As seen from the foregoing, the process of this invention makes it possible to remove residual solvent from acetylene-terminated polyimide oligomers. As a result of the removal of the residual solvent, the oligomers are easier to process. Furthermore, the purified oligomers can be molded into bodies that are free of voids and cracks.

As will be evident to those skilled in the art modifications of the present invention can be made in view of the foregoing disclosure without departing from the spirit and scope of the invention.

We claim:

1. A process for purifying an acetylene-terminated polyimide oligomer containing a residual amount of the solvent used as the reaction medium in its synthesis which comprises the steps of:

(a) dissolving the oligomer in the same solvent used as the reaction medium in its synthesis;

(b) mixing the resulting solution with an aqueous solution of potassium or sodium chloride, thereby causing the oligomer to precipitate from solution;

(c) separating the precipitated oligomer from the aqueous solution;

(d) successively washing the separated oligomer at least once in each of a series of five liquid baths of decreasing polarity, the first of said baths consisting essentially of water, the second of said baths consisting essentially of a mixture of methanol and water, the third of said baths consisting essentially of methanol, the fourth of said baths consisting essentially of a mixture of ether and methanol, and the fifth of said baths consisting essentially of ether; and (e) recovering and drying the purified oligomer from the said fifth bath.

2. The process according to claim 1 in which the oligomer is dissolved in a solution containing about 4 to 10 weight percent potassium or sodium chloride in water.

3. A process for purifying an acetylene-terminated polyimide oligomer containing a residual amount of 1-methyl-3-pyrrolidinone, said oligomer having the following structural formula:

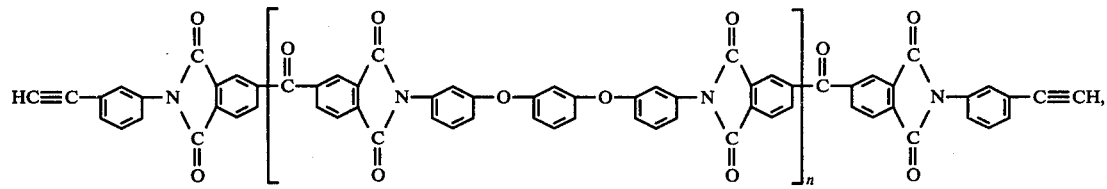

wherein n is 1 or 2,
said process comprising the steps of:
(a) dissolving the oligomer in 1-methyl-2-pyrrolidinone;
(b) mixing the resulting solution with an aqueous solution containing about 4 to 10 weight percent potassium or sodium chloride, thereby causing the oligomer to precipitate from solution;
(c) separating the precipitated oligomer from the aqueous solution;
(d) successively washing the precipitated oligomer at least once in each of a series of five liquid baths, said baths consisting essentially of (1) water, (2) a mixture of methanol and water, (3) methanol, (4) a mixture of ether and methanol, and (5) ether; and
(e) recovering and drying the purified polymers from the last bath.

4. The process according to claim 3 in which the oligomer is washed successively with water, a mixture containing by volume 50% methanol and 50% water, methanol, a mixture containing by volume 20% ether and 80% menthanol, a mixture containing by volume 40% ether and 60% methanol, a mixture containing by volume 60% ether and 40% methanol, a mixture containing by volume 80% ether and 20% methanol, and ether.

* * * * *